Figure 1:
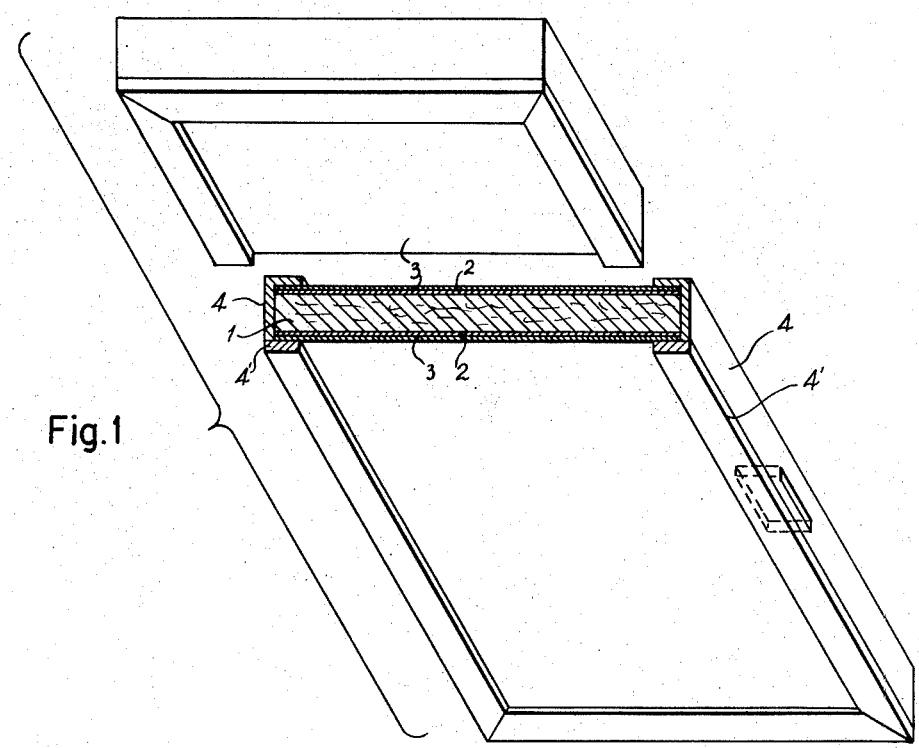

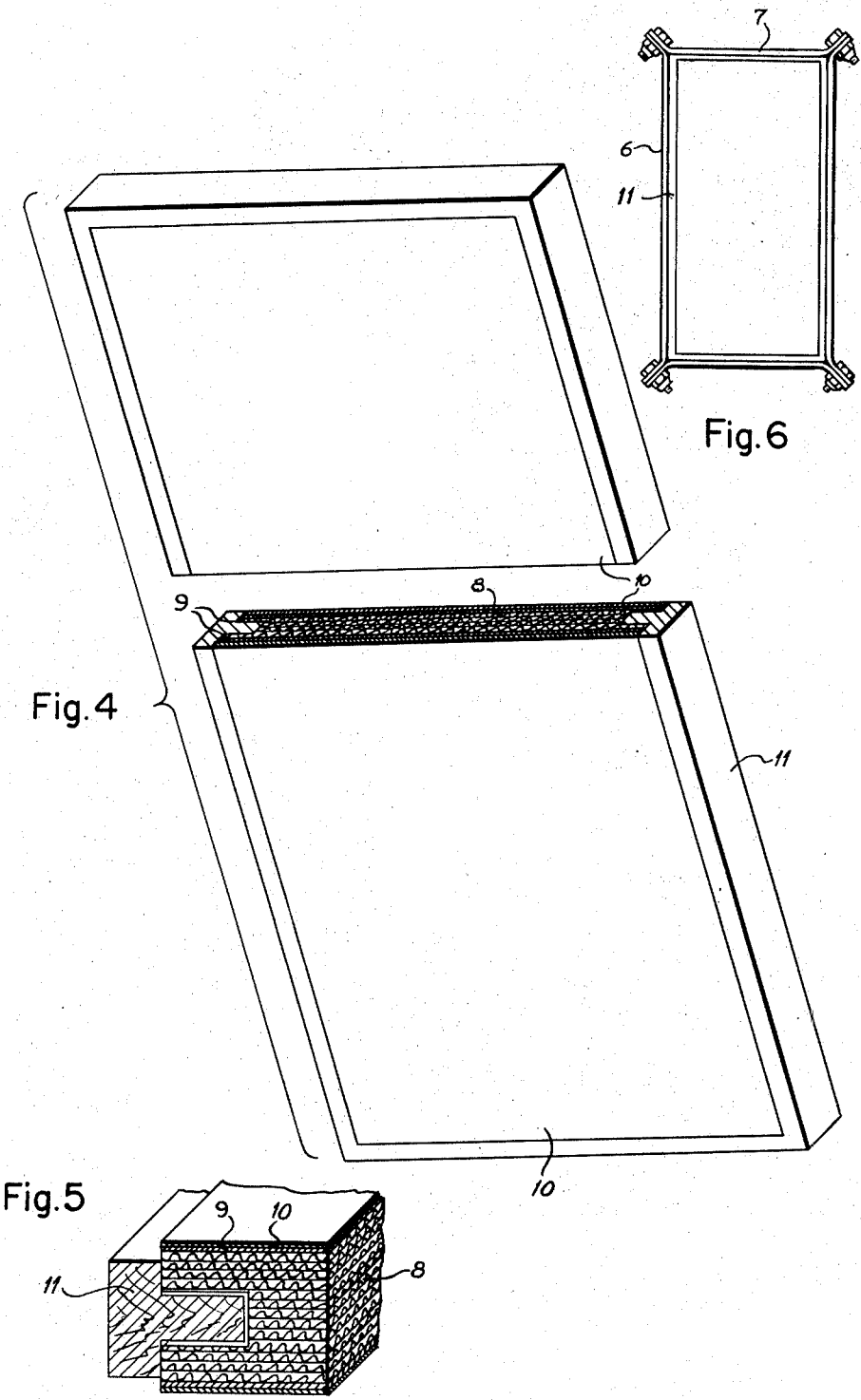

United States Patent Office 2,890,977
Patented June 16, 1959

---

2,890,977

PROCESS FOR THE PRODUCTION OF DOORS FROM PLASTICS IN A SINGLE OPERATION

Erich Bayer and Luigi Rizzi, Milan, Italy

Application September 16, 1953, Serial No. 380,431

Claims priority, application Italy September 18, 1952

7 Claims. (Cl. 154—110)

The advantages of plastic panels and doors over wooden ones are known and can be summarised as comprising lower weight, greater thermal and acoustic insulating properties and above all complete resistance to deformation under the action of humidity and heat.

It is known that for fabricating plastic doors, panelling is used, constituted by a thickness of light filling material (such as Populit, resin foam, honey comb or isocarver), covered on the two faces with metal, paper or wood sheets, various types of fabrics (such as natural, or synthetic fibres, glass fabrics, asbestos) or by laminated resins with paper and other reinforcements.

The above mentioned filling materials are impregnated before use with liquid resins or resins dissolved in suitable solvents, by immersion or sprinkling or by spreading and varnishing, and then dried and subjected to subsequent finishing operations.

It is also known that according to current practice plastic doors are made by pressing the various parts constituting them and then uniting said parts together by bonding and pressing in several subsequent operations.

An object of the present invention is the fabrication of plastic doors in a single operation, that is, without the separate pressing of the various elements and successive bonding, such a method making possible a substantial reduction in cost.

The invention accordingly provides a method of fabricating doors and like panels comprising facings bonded with the aid of intervening sheets of resin impregnated material upon a layer of compressible filling and/or insulating material, consisting in temporarily comforming the edges of said facing, body sheets and filling layer and applying to the facings equally distributed pressure so as to effect in a single operation compression of the filling layer, bonding together of the facings, body sheets and filling layer, and to afford smooth finish to both facings.

The invention further affords a modification of the aforesaid method, for fabricating doors and like panels comprising facings bonded with the aid of intervening sheets of resin impregnated material upon a layer of compressible filling and/or insulating material within frame members of resin-impregnated wood or plastic material wherein the edges of the frame are temporarily arranged about said filling layer with the body sheets and facings laid thereon prior to compression, and equally distributed pressure is applied to the facings so as to effect in a single operation compression of the filling layer to bring the facings into the planes of the marginal surfaces presented by the frame members, to effect bonding together of the frame members, facings, body sheets and filling layer, and to afford smooth finish to both sides of the finished panel.

A further modification of the method as recited in the preceding paragraph is afforded by the invention, wherein equally distributed pressure is applied to the facings and to marginal surfaces presented by the frame members, in such manner as to compress the filling layer to an extent bringing the facings to planes inside the planes of said marginal surfaces.

In performing the method of the invention, a door or like panel (which for convenience will hereinafter be referred to as a door) may be fabricated by hot pressing in a press, preferably a multi-stage press, the bonding of the several elements into solid whole being obtained by the use of thermosetting resins.

The pressing may be effected under suitable pressure and temperature and for a suitable time period, individually regulated in conformity with the type or types of resins used for the impregnation and bonding of the several elements constituting the door.

Advantageously, the working pressure may vary between 5 and 30 kg., per square centimeter and preferably between 10 and 20 kg., per sq. cm.; the operating temperature may be within the range 120° to 200° C. and preferably within the range 140° to 170° C.; and the duration of pressing may be for a time period of 10 to 30 minutes, preferably 15 to 25 minutes.

The invention further affords apparatus for carrying out the method comprising an assembly of preferably iron strap or frame members securable about the perimeter of the several elements of the door (previously this operation was performed using metal structures (molds) standardised and compulsorily different for each different size of the doors; according to the present invention the molds are eliminated and substituted by a simple metal frame, whose four rolled elements may be easily modified in such a way to obtain different sizes of doors, being not anymore necessary to dispose of different molds for different sizes), as by screw means engaging lugs on said straps, and pressure applying and distributing members constituted by metal plates having polished or plated, e.g. chromium plated, surfaces. Said strap members are interconnected and retained in clamping engagement around the perimeter of the door assembly, for example by screw means applied at the corners, so as to hold the assembly firmly without in any way hindering the simultaneous pressing of the two door faces. The strap members may be laminar or if required for strength or rigidity may be of rolled section steel, for example angle section or channel section.

Obviously according to the sizes of particular doors to be fabricated such strap members may be provided in a variety of interchangeable lengths.

The pressure distributing plates are of course to be provided in sizes corresponding to the sizes of the panel or panels in a particular door to be fabricated. In the case of a door wherein one or both of the panel facings is or are to be pressed into mono-planar disposition with marginal surfaces presented by a surrounding frame, it is evident that the pressure distributing plate may extend beyond the edges of said frame. The provision of such pressure plates with polished or preferably chromium plated surface ensures a smooth finish to the surfaces which they engage.

The simplicity and adaptability of clamping means and pressure plates which serve to secure uniform distribution of pressure, according to the invention, enables the performance of non-standardised production which is variable at will according to the types and sizes of doors required, without any substantial variation in the operating costs.

Figure 2:
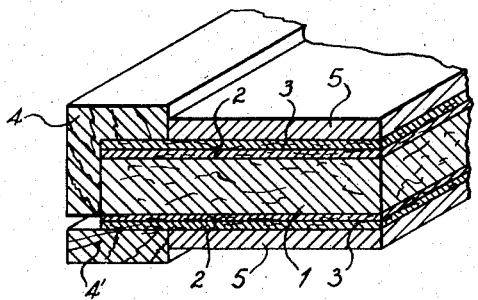
Figure 3:
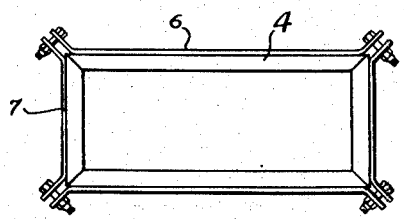

In order that the invention may be better understood two embodiments of doors produced thereby and the respective modes of production will be described by way of example, and without limitation, with reference to the accompanying drawings, wherein:

Fig. 1 is a broken perspective view of one embodiment of door,

Fig. 2 is a fragmentary section of various elements assembled prior to the fabrication of such door, Fig. 3 is a plan view of the door elements assembled within a clamping frame, Fig. 4 is a broken perspective view of another embodiment of a door, Fig. 5 is a fragmentary section illustrating the assembly of the elements of the latter door prior to fabrication, and Fig. 6 is a plan view of said assembly within a clamping frame.

The door as shown in Fig. 1 is composed of a thick filling layer 1 of Populit to each surface of which is applied a bonding layer of resin impregnated paper 2, a facing layer of impregnated paper or impregnated veneer 3 being applied to each bonding layer and serving to constitute the finished facing of the inner door panel which is disposed within a frame formed of the side and end door panels.

The frame itself is made up of slat strips 4 and angle sections 4' of resin impregnated wood, or equivalent assembly of sections of resin impregnated wood which when subjected to the hot pressing application are united to form a channel section frame as shown in Fig. 1.

The several elements assembled as shown in Fig. 2 are clamped together between four elements comprising pairs of longer elements 6 and shorter elements 7 secured together and about the perimeter of the assembly by screw means passed through lugs extending diagonally at the corners as shown in Fig. 3.

For the hot pressing of this door the pressure distributing members include two plates 5 with chromium plated inner or contact surfaces which are suitably dimensioned to bear on the facing layer 3 within the inner margins of the frame members 4 and 4'. There are also used additional pressure distributing plates (not shown) which are larger than the plates 5 and bear upon the marginal surfaces presented by the frame members 4 and 4'.

Obviously in the course of pressing, the larger plates urge the frame members 4 and 4' together until they are united, and the sandwich of elements 1, 2 and 3 is compressed between said frame members at the margins and between the plates 5 within the margins so as to produce a door as shown in Fig. 1 wherein the webs of the channel section frame project above the facings 3 to an extent equal to the thicknesses of the pressure plates 5. By way of example it may further be stated that the pressing operation upon a door as shown in Fig. 1 may be effected at a pressure of 15 kg. per sq. cm. under a temperature of 160° C. and for a time period of 20 minutes. The door thus fabricated may have a weight of about 15 kg. per sq. m.

The door as shown in Figures 4 and 6 comprises an inner filling of corrugated pasteboard or isocarver sheets 8 to both surfaces of which are applied first a bonding layer 9 of impregnated pasteboard and then a facing layer 10 of impregnated paper. A frame is provided by T-section members 11 of resin impregnated wood, the dimensions of the inner filling sheets 8 being less than those of the outer groups of such sheets to accommodate the shank webs of the frame members 11.

In the pressing of such door, two pressure distributing plates may be employed each of which is as large as or larger than the size of the finished door, the operation being effected in such manner that the sandwich of filling elements 8, bonding elements 9 and facings 10 is compressed to the same final thickness as that of the frame members 11, to produce a door as shown in Fig. 4.

For retaining the several elements in assembly during the pressing operation, clamping means may be employed as shown in Fig. 6 and as described with reference to Fig. 3.

In the operation of pressing a door as last described there may also, for example, be employed a pressure of 14 kg. per sq. cm. and a temperature of 160° C. for a pressing period of 20 minutes, to afford a door weighing about 9 kg. per sq. m.

What we claim is:

1. The method of manufacturing panel doors having a rigid perimetric door framework surrounding and supporting a pair of spaced facing panels between which there is compressible filler material, which comprises impregnating said framework and panels with thermosetting resin, assembling said door framework, panels, and filler material, the panels being marginally disposed within the internal dimensions of the framework as in the finished door, the total thickness of the panels and compressible material being initially greater than that in the finished door, securing said framework and panels in said assembled disposition and against lateral expansion by the application of restraint against the perimetric edge of said frame, and then applying pressure and heat to the outside surfaces of said panels to compress the filler material and bond the panels in one operation into a unitary door structure with said framework by reason of flow of the resin impregnated in said framework and panels, whereby a door of substantially finished outline is directly obtained.

2. The method of manufacturing panel doors having a rigid perimetric door framework surrounding and supporting a pair of spaced facing panels between which there is compressible filler material, which comprises impregnating said framework and panels with thermosetting resin, assembling said door framework, panels, and filler material, the panels being marginally confined within the framework as in the finished door, the total thickness of the panels and compressible material being initially greater than that in the finished door, securing said framework and panels in said assembled disposition and against lateral expansion by the application of restraint laterally against the perimetric edge of said frame, and then applying pressure and heat to the outside surfaces of said panels and of the door framework to compress the filler material and bond the panels in one operation into a unitary door structure with said framework by reason of flow of the resin impregnated in said framework and panels, the door framework being initially formed of two juxtaposed, separable elements between which the panels and the filler material are sandwiched, so that the door framework is converted into an integral unified structure with said panels in said one operation.

3. The method of manufacturing panel doors having a rigid perimetric door framework surrounding and supporting a pair of spaced facing panels between which there is compressible filler material, which comprises impregating said framework and panels with thermosetting resin, assembling said door framework, panels, and filler material, the panels being marginally disposed within the internal dimensions of the framework as in the finished door, securing said framework and panels in said assembled disposition and against lateral expansion by the application of restraint against the perimetric edge of said frame, and then applying pressure and heat to the outside surfaces of said panels to bond them in one operation into a unitary door structure with said framework by reason of flow of the resin impregnated in said framework and panels, whereby a door of substantially finished outline is directly obtained, the framework having an inwardly directed flange intermediate its longitudinal faces, the filler material being disposed above, below, and laterally within the flange, the facing panels initially respectively extending above and below the planes of the outside faces of the framework, the said application of pressure compressing the panels and the filler to an extent at least sufficient to make the panels co-planar with the said faces of the framework.

4. The process described in claim 1 in which the framework is of resin impregnated wood, and the panels are of a material taken from the group consisting of resin impregnated paper and resin impregnated wood veneer.

5. The process described in claim 1, the framework being resin impregnated wood, the compressible filler material being corrugated pasteboard.

6. The process described in claim 2 in which the framework is of resin impregnated wood, and the panels are of a material taken from the group consisting of resin impregnated paper and resin impregnated wood veneer.

7. The process described in claim 2, the framework being resin impregnated wood, the compressible filler material being corrugated pasteboard.

References Cited in the file of this patent
UNITED STATES PATENTS

| | | |
|---|---|---|
| 1,867,575 | Loetscher | July 19, 1932 |
| 2,340,208 | Skolnik | Jan. 25, 1944 |
| 2,385,352 | Davis | Sept. 25, 1945 |
| 2,441,699 | Gramelspacher | May 18, 1948 |
| 2,445,290 | Gonda | July 13, 1948 |
| 2,455,055 | Gray | Nov. 30, 1948 |
| 2,517,698 | Muskat | Aug. 8, 1950 |
| 2,629,140 | Clements | Feb. 24, 1953 |
| 2,668,788 | Waldherr | Feb. 9, 1954 |

FOREIGN PATENTS

| | | |
|---|---|---|
| 157,429 | Great Britain | Jan. 10, 1921 |
| 157,432 | Great Britain | Feb. 23, 1922 |